Patented July 22, 1930

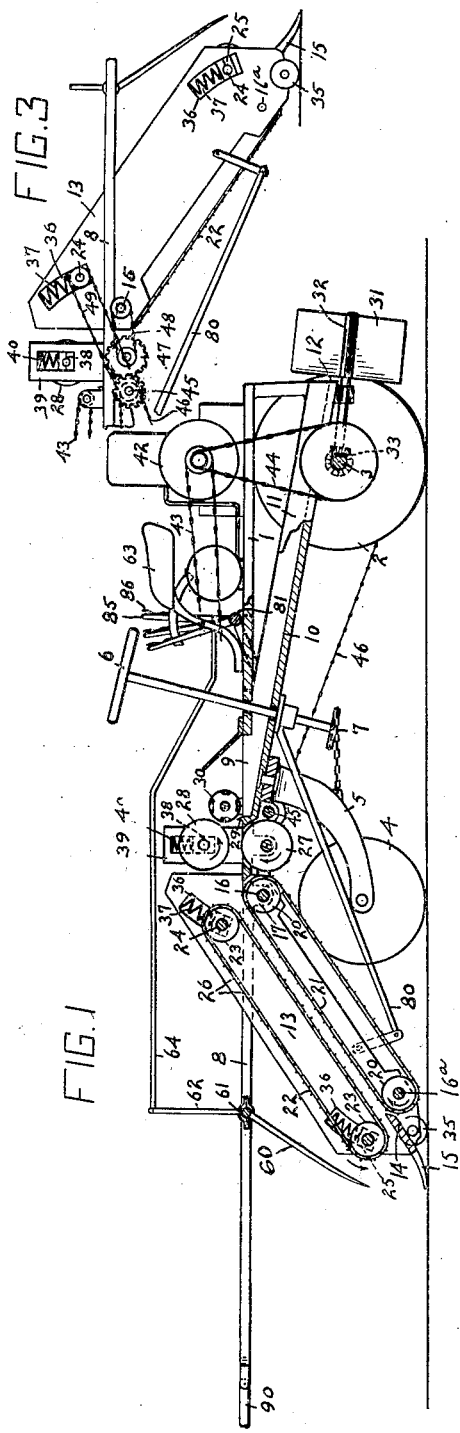

1,771,025

UNITED STATES PATENT OFFICE

JAMES BARRY, OF LOS ANGELES, CALIFORNIA

AGRICULTURAL IMPLEMENT

Application filed November 8, 1926. Serial No. 146,871.

This invention is an agricultural implement for chopping up vines, stalks, and the like and scattering the chopped material on the ground as a fertilizer; and it is the object of the invention to move the implement over a field so as to pick up the vines or stalks and carry the same to a suitable chopper from which the material is conveyed to a distributor for scattering it over a wide area.

It is a further object of the invention to adapt the implement for use with material which has been gathered in stalks or shocks, by providing a removable and adjustable rake at the front of the implement for spreading out piled material so that it may be readily carried to the chopping mechanism.

It is a still further object of the invention to provide a power driven mechanism for operating the various movable parts of the implement; and to mount the implement on a vehicle frame which may be driven by the drive mechanism or hauled by a team as found expedient.

Further objects of the invention will be readily understood from the following description of the accompanying drawings, in which:

Fig. 1 is a vertical section through the implement.

Fig. 2 is a plan view of the same.

Fig. 3 is a fragmentary side elevation showing the driving connections.

The implement is mounted on a vehicle frame 1, having rear drive-wheels 2 fixed on a rotatable axle 3, and front steering wheels 4 journaled on a bracket 5 which may be turned by a usual steering wheel 6 through the medium of a sprocket connection 7.

The front end of the frame forms transversely spaced side bars 8; and in back of said side bars the frame has a transverse discharge opening 9 communicating with a rearwardly extending downwardly inclined discharge apron 10 which terminates at the rear of the vehicle frame just above the axle 3. Side frames 11 prevent the material on the apron from falling from its sides, and the rear end of the apron preferably tapers to reduced width to form a discharge 12.

A conveyor is mounted between the side bars 8; and comprises sloping side frames 13 connected at their front end by a platform 14 from which teeth or prongs 15 project, and the rear end of frames 13 are journaled on a shaft 16, the projecting ends of which are journaled in brackets 17 at the inner ends of side bars 8, so that the front end of the conveyor may be swung up or down.

A shaft $16^a$ is journaled between the swinging ends of side frames 13, just below and in back of platform 14; and drums 20 on the shafts 16 and $16^a$ are adapted to receive an endless conveyor 21. A second endless conveyor 22 is mounted between the side frames 13 in spaced relation above conveyor 21, this second conveyor being received on drums 23 which are fixed on shafts 24 journaled in bearings 25 in the side frames 13.

The endless conveyors 21—22 are preferably linked slat structures having projecting teeth 26; and are adapted to revolve as indicated by the arrows in Fig. 1, so that material drawn onto platform 14 by movement of prongs 15 along the ground, is carried upwardly between the endless conveyors.

A horizontal roller 27 is journaled in a transverse opening in frame 1 just in back of the endless conveyors 21—22 so as to receive material from the conveyors; and the roller 27 cooperates with a vertically spaced similar roller 28, to crush the material and hold the same while drawing it through the rollers by rotation of the latter in the direction indicated by arrows in Fig. 1.

The rollers 27—28 feed the material onto a transverse vertical knife 29 at the front end of opening 9; and the blades of a revolving cutter 30 cooperate with knife 29 to cut the material into small pieces which drop through opening 9 onto apron 10. The inclination of apron 10 feeds the chopped material to discharge 12 where it drops onto a rotating distributor 31 for scattering the material, and the distributor preferably comprises a plurality of radial blades on a longitudinal shaft 32 which is journaled beneath apron 10 and may be driven by axle 3 through gearing 33.

Ground engaging wheels 35 may be provided at the front end of the elevating mechanism of the implement, so as to position prongs 15 in close proximity to the ground; and movement of the implement through a field will thus lift cut vines, stalks or the like onto platform 14 from whence they are carried upwardly between the conveyors 21—22. In order to prevent clogging and accommodate the elevating mechanism to material of any length or thickness, the upper conveyor 22 is preferably adapted for limited vertical movement relative to the lower conveyor 21; and for this purpose the bearings 25 are preferably slidable in grooves 36 provided in the side frames 13, with the bearings yieldably held at their lower limit of movement by springs 37.

The crushing of the material as it passes between rollers 27—28 is preferably also self-regulating; and for this purpose upper roller 28 is journaled in bearings 38 which are vertically slidable in guideways 39 and are yieldably depressed by springs 40.

A power-drive, shown as an internal combustion engine 42, is preferably provided on frame 1; and the rotary cutter 30 may be driven directly from the engine by a sprocket chain 43. The elevating mechanism and the crushing rollers are preferably driven from axle 3; and the engine 42 may rotate the axle through sprocket chain 44 so as to provide a self-propelled vehicle, or the implement may be drawn by any desired draft means imparting the necessary rotation to the axle.

The driving connection between axle 3 and the elevating and crushing mechanism, preferably includes a transverse counter-shaft 45 beneath apron 10 and projecting beyond the sides of frame 1. A sprocket chain 46 at one side of the vehicle drives shaft 45 from axle 3; and the shaft 45 rotates roller 27 through meshing gears 47 at each side of the implement. The upper roller 28 need not be rotated by a positive driving connection since its pressure engagement with the material passing between the rollers will cause its frictional rotation.

The endless conveyors 21—22 may be driven by shaft 45 and roller 27 respectively, to cause the required revolving of the endless conveyors in opposite directions, and as an instance of this arrangement the shaft 16 may be connected to the stub shaft extensions of roller 27 which carry gears 47, by means of sprocket chains 48, and the shaft 45 may be connected to the shaft 24 which is at the inner end of conveyor 22, by means of sprocket chains 49. The shafts 24 at the respective ends of conveyor 22, and the shafts 16—16ª at the ends of conveyor 21, may be connected by sprocket chains 50 and 51 respectively.

In order to permit yielding movement of bearings 25 in grooves 36, and still maintain the sprocket chains 49 taut for driving the shaft 24 which is journaled in the bearings at the inner end of conveyor 22, the grooves 36 for said inner bearings are arcuate and concentric with shaft 45 as shown in Fig. 3, and the sprocket chains 49 are of a length to provide a driving connection when the elevating mechanism is swung downwardly to operative position, with said chains hanging slack and idle when the elevating mechanism is swung upwardly to inoperative position. The sprocket chains 50 are maintained taut during movement of bearings 25 in the grooves 36 at the respective ends of conveyor 22, by curving the grooves 36 at the outer end of the conveyor on an arc shown in Fig. 1 which is adapted to maintain equal spacing of shafts 24 during elevation of conveyor 22 in parallel relation to conveyor 21.

A rake may depend from the side bars 8 in front of the elevating mechanism, the rake being shown as teeth or prongs 60 depending from a transverse shaft 61 which is preferably removably journaled on the side bars 8, so that the teeth may be swung to adjusted position relative to the ground in front of and above the endless conveyors, for spreading out material which may have been piled in stacks, in order that the material may be readily engaged by prongs 15 for lifting it to the elevating mechanism. The rake may be swung to adjusted position by a lever 62 which is adapted to turn shaft 61; and the lever may be operated from the driver's seat 63 by a pull rod 64.

By removing shaft 61 from its bearings in side bars 8, the rake may be detached from the implement when operating in vines or stalks which are already properly spread out on the ground.

The elevating conveyor of the implement may be lowered to operative position shown in Fig. 1, or may be swung upwardly to clear the ground when the implement is not in use, by link connections 80 which are actuated by a shaft 81 at the driver's seat 63; and the shaft 81 as well as the pull rod 64, each have a manual operating lever 85 adapted to be locked in adjusted position by a usual segmental latch 86.

If it is desired to draw the implement by draft means rather than to utilize engine 42 as a propelling medium, draft connections shown as shafts 90 for live stock, may be provided at the front ends of side bars 8 in such position as to leave a strip of material to be engaged by the implement between the draft animals.

I claim:

1. An implement of the character described comprising a vehicle frame, a depending rake pivoted at the front of the frame for vertical adjustment of the rake relative to the ground, said rake being adapted to spread out material piled on the ground, means in rear of the rake for elevating the material, means on the frame for chopping the elevated material, and means for scattering the chopped material over the ground.

2. An implement of the character described comprising a vehicle frame, a sloping frame extending forwardly and downwardly from the front of the vehicle frame, a lower endless conveyor extending longitudinally of the sloping frame, arcuate guides in the sloping frame above the respective ends of the lower endless conveyor, bearings in said guides, said bearings being yieldably urged toward the lower endless conveyor, transverse shafts journaled in said bearings, an upper endless conveyor mounted on said shafts, a drive shaft on the vehicle frame, and a driving connection between the drive shaft and one of the transverse shafts for the upper endless conveyor, the arcuate guide for the yieldable bearing for said driven shaft being arranged whereby movement of said bearing in its arcuate guide is arcuately concentric with the drive shaft, and the arcuate guide for the yieldable bearing for the other transverse shaft being arranged whereby movement of said bearing in its arcuate guide is along an arc adapted to maintain the transverse shafts in the same spaced relation during yielding of the bearings for said transverse shafts relative to the lower endless conveyor.

3. An implement of the character described comprising a vehicle frame, means for elevating vegetation relative to the frame, means extending substantially the width of the frame in front of the elevator for engaging vegetation and spreading it out on the ground prior to its engagement by the elevator, means independent of the elevator for fixing said engaging means in vertically adjusted position, means on the frame for chopping the elevated material, and means for scattering the chopped material over the ground.

4. An implement of the character described comprising a vehicle frame, a depending rake at the front of the frame, means for vertically adjusting the prongs of the rake relative to the ground, the rake being adapted to spread out material piled on the ground, means in rear of the rake for elevating the material, means on the frame for chopping the elevated material, and means for scattering the chopped material over the ground.

5. An implement of the character described comprising a vehicle frame, a sloping frame extending forwardly and downwardly from the front of the vehicle frame, a lower endless conveyor extending longitudinally of the sloping frame, arcuate guides in the sloping frame above the respective ends of the lower endless conveyor, bearings in said guides, said bearings being movable relative to the lower endless conveyor, transverse shafts journaled in said bearings, an upper endless conveyor mounted on said shafts, a drive shaft on the vehicle frame, and a driving connection between the drive shaft and one of the transverse shafts for the upper endless conveyor, the arcuate guide for the movable bearing for said driven shaft being arranged whereby movement of said bearing in its arcuate guide is arcuately concentric with the drive shaft, and the arcuate guide for the movable bearing for the other transverse shaft being arranged whereby movement of said bearing in its arcuate guide is along an arc adapted to maintain the transverse shafts in the same spaced relation during movement of the bearings for said transverse shafts relative to the lower endless conveyor.

6. An implement of the character described comprising a vehicle frame, a sloping frame extending forwardly and downwardly from the front of the vehicle frame, a lower endless conveyor extending longitudinally of the sloping frame, arcuate guides in the sloping frame above the respective ends of the lower endless conveyor, bearings in said guides, said bearings being movable relative to the lower endless conveyor, transverse shafts journaled in said bearings, an upper endless conveyor mounted on said shafts, a drive shaft or the vehicle frame, sprockets on the drive shaft and on one of the transverse shafts for the upper endless conveyor, a sprocket chain engaging said sprockets for driving said transverse shaft, the arcuate guide for the movable bearing for said driven transverse shaft being arranged whereby movement of said bearing in its arcuate guide is arcuately concentric with the drive shaft, and the arcuate guide for the movable bearing for the other transverse shaft being arranged whereby movement of said bearing in its arcuate guide is along an arc adapted to maintain the transverse shafts in the same spaced relation during movement of the bearings for said transverse shafts relative to the lower endless conveyor.

7. An implement of the character described comprising a vehicle frame, a sloping frame extending forwardly and downwardly from the front of the vehicle frame, a lower endless conveyor extending longitudinally of the sloping frame, bearings on the sloping frame above the respective ends of the lower endless conveyor, said bearings being movable relative to the lower endless conveyor, transverse shafts journaled in said bearings, an upper endless conveyor mounted on said shafts, a drive shaft on the vehicle frame, sprockets on the drive shaft and on one of the transverse shafts for the upper endless conveyor, and a sprocket chain engaging said sprockets for driving said transverse shaft, an arcuate guide in the sloping frame, the movable bearing for said driven transverse shaft being movable in said arcuate guide, and said arcuate guide being arranged whereby movement of the bearing therein is arcuately concentric with the drive shaft.

8. An implement of the character described comprising a vehicle frame, a sloping frame extending forwardly and downwardly from the front of the vehicle frame, a lower endless conveyor extending longitudinally of the sloping frame, bearings on the sloping frame above the respective ends of the lower endless conveyor, transverse shafts journaled in said bearings, an upper endless conveyor mounted on said shafts, a drive shaft on the vehicle frame, sprockets on the drive shaft and on one of the transverse shafts for the upper endless conveyor, and a sprocket chain engaging said sprockets for driving said transverse shaft, an arcuate guide in the sloping frame, the bearing for said driven transverse shaft being movable in said arcuate guide relative to the lower endless conveyor, and said arcuate guide being arranged whereby movement of the bearing therein is arcuately concentric with the drive shaft.

In testimony whereof he has affixed his signature to this specification.

JAMES BARRY.